United States Patent
Paviak

[15] 3,676,373
[45] July 11, 1972

[54] DETERGENT COMPOSITIONS

[72] Inventor: Stanley C. Paviak, Shaler Township, Allegheny County, Pa.

[73] Assignee: Gulf Research & Development Company, Pittsburgh, Pa.

[22] Filed: July 20, 1970

[21] Appl. No.: 56,734

[52] U.S. Cl..............................252/531, 252/89, 252/132, 252/135, 252/523, 252/535, 252/536, 252/539, 252/541, 252/546, 252/550, 252/554, 252/555, 252/558
[51] Int. Cl......................................C11d 3/065, C11d 1/12
[58] Field of Search...................252/135, 137, 138, DIG. 2, 252/89, 531, 535, 536, 539, 550, 554, 555, 558; 260/78.5 BB

[56] References Cited

UNITED STATES PATENTS

| 3,328,309 | 6/1967 | Grifo et al. | 252/137 |
| 3,485,762 | 12/1969 | Gower et al. | 252/137 |
| 3,079,336 | 2/1963 | Stright et al. | 252/8.55 |
| 3,235,505 | 2/1966 | Tuvell | 252/135 |

*Primary Examiner*—Herbert B. Guynn
*Attorney*—Meyer Neishloss, Deane E. Keith and Donald L. Rose

[57] ABSTRACT

Detergent compositions are disclosed which incorporate as a builder a water-soluble salt of a copolymer consisting of ethyl benzene and succinic acid groups in a 1:1 ratio and having a molecular weight of at least 3,000 and, optionally, a polyphosphate.

7 Claims, No Drawings

DETERGENT COMPOSITIONS

This invention relates to novel detergent compositions containing a water-soluble salt of a copolymer consisting of ethyl benzene and succinic acid groups and, optionally, a polyphosphate to enhance the cleaning performance of the detergent compositions.

The mechanism by which detergent builders perform their function is not well understood and therefore it is not possible to accurately predict the existence of builder properties in a composition. For example, this is carefully set forth in U.S. Pat. No. 3,308,067. In this patent, which discloses a series of polyelectrolyte builders for use in detergent compositions, it is stated that a 1:1 copolymer of styrene and maleic acid is not a suitable builder composition.

Notwithstanding this negative conclusion in U.S. Pat. No. 3,308,067 and consistent with this avowed unpredictability in this field, I have discovered that a water-soluble salt of a copolymer consisting of substantially equal amounts of ethyl benzene and succinic acid groups is a highly suitable builder material, provided that, suitable molecular weight limits of the copolymer are maintained. As a part of my invention, I have discovered that the molecular weight should be at least about 3,000 with the upper limit determined primarily by the solubility characteristics of the salts in aqueous systems.

The builder component is more specifically defined as the water-soluble salt of a copolymer of styrene and maleic anhydride, maleic acid or fumaric acid having the general formula:

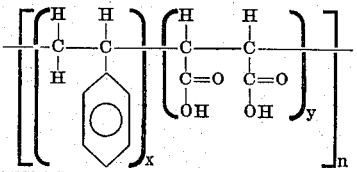

wherein the ratio of x and y is about 1, n is at least about 13 and the equivalent weight is about 110.

The copolymer is formed by the copolymerization of styrene with a substantially equal amount of maleic acid, maleic anhydride, fumaric acid or their mixtures. Since the copolymer is hydrolyzed or neutralized to produce the water-soluble salt, the builder material is identified as the water-soluble salt of the copolymer in the acid form for convenience in determining the equivalent weight even though maleic anhydride may be used in its preparation. Copolymers made from styrene and maleic anhydride are commercially available as very low molecular weight polymers, that is, less than 3,000. To my knowledge these materials are not generally available within a molecular weight range required by my invention. Therefore, the polymers required by my invention are specially produced.

The copolymer builder compositions of this invention can be effectively used with any anionic and non-ionic surfactants or mixtures thereof. Anionic surfactants are well known and comprise those compounds which contain a hydrophobic organic radical containing from about 10 to 22, preferably 10 to 18, carbon atoms and a hydrophilic sulfate or sulfonate radical. The alkali metal salts of alkyl sulfates, alkylaryl sulfonates, alkane sulfonates and olefin sulfonates are illustrative of this type. Non-ionic detergent compounds are also well known and broadly comprise those products of an aliphatic or alkyl aryl nature derived by condensation of appropriate hydrophobes, such as fatty alcohols, alkylphenols, fatty acids, fatty amides and fatty amines with ethylene and/or propylene oxides to form polyoxyalkylene derivatives. In these non-ionic compounds the hydrophobic moiety contains from about 10 to 22, preferably 10 to 18, carbon atoms and the polyoxyalkylene moiety contains about 5 to 20 repeating groups. These surfactants include such well known materials as the sodium or potassium salts of the fatty acids derived from coconut oil and tallow; the water-soluble salts of alkyl sulfonic acid and sulfuric acid esters having from 10 to 22 carbon atoms such as those produced by sulfating the higher alcohols including lauryl alcohol, stearol and the like; the sodium or potassium alkyl benzene sulfonates having from nine to 16 carbon atoms in the alkyl group; sodium alkyl glyceryl ether sulfonates; sodium coconut oil fatty acid monoglyceride sulfates and sulfonates; sodium or potassium salts of sulfuric acid esters of the reaction product of a higher fatty alcohol and about 1 to 6 mols of ethylene oxide and the like. The copolymers can be effectively used alone as the sole builder component of the detergent formulation or they can be used in combination with one or more other builder materials to form a builder composition of mixed chemical types. For example, other builder materials with which the copolymer can be used are the polyphosphates, such as the alkali metal tripolyphosphates and the alkali metal pyrophosphates.

The copolymers can comprise as little as about 10 percent of the builder composition but preferably comprise at least about 20 percent of the total builder composition. In the detergent formulations utilizing these water-solubles salts of the copolymers defined by the above general formula, the weight ratio of builder to surfactant is within the range conventionally used in detergent formulations whether all or only a part of the builder component comprises these water-soluble salts of the copolymers. This range of builder to surfactant is generally within a ratio of about 1:2 to about 10:1 and preferably a ratio of about 1:1 to about 5:1.

The water-soluble salt of the copolymer can be an alkali metal salt such as sodium or potassium or an ammonium or a lower alkyl substituted ammonium salt. The copolymer can be either partially neutralized or fully neutralized to a useful water-soluble salt. The type of salt used will depend in part on the end use of the detergent composition and whether it is compounded in the dry or liquid form.

The essential ingredients of the detergent compositions of this invention are an anionic or non-ionic surfactant as described above, either used alone or in combination, and the novel builder composition. These detergent compositions can be formulated into any one of several useful physical forms such as granular, flake, tablet and liquid forms. In formulating these detergent compositions one or more additional conventional property modifying or enhancing constituents can be added, such as water and/or alcohol for liquid detergents, soil redeposition inhibitors, tarnish inhibitors, perfumes, colorants, pH adjusters, brightening agents, bleaching agents, corrosion inhibitors, enzymes, hydrotropes, sodium sulfate, sodium carbonate, etc. The pH of a detergent made in accordance with my invention will, in general, fall within the range of about 9.5 to about 11.5.

The following examples are set out to illustrate the novel compositions of my invention and to provide a better understanding of the details and advantages of the invention.

EXAMPLE 1

A copolymer of styrene and maleic anhydride was made by solution polymerization. A one liter resin flask, equipped with a mechanical stirrer, reflux condenser and thermometer was charged with 750 ml. benzene, 24.5 grams (0.21 mol) maleic anhydride, 26.0 grams (0.25 mol) styrene and 0.6 gram of benzoyl peroxide. This solution was heated at 70° C. for 3 hours during which the solution became milky indicating polymer formation. Heating was continued for 2¼ hours at 70° to 75° C. After cooling the resulting slurry, it was filtered and the copolymer was dried to 48.2 grams of product. It was determined to have an average molecular weight of about 4,900. A one percent stock solution of the di-sodium salt of the copolymer was prepared by placing 7.7 grams of the copolymer in warm water to which was then added 29.3 grams of 10 percent sodium hydroxide solution while heating. This resulting solution was brought to a volume of one liter with additional water. The resulting stock solution was viscous and somewhat hazy.

EXAMPLE 2

The sodium salt of the styrene-maleic anhydride copolymer of Example 1 was compared as a detergent builder with a series of commercially available copolymers of styrene and maleic anhydride. These commercial copolymers were converted to their sodium salts by the procedure described in Example 1. In carrying out the tests, a series of solutions were made containing 0.05 percent of a commercial surfactant consisting of a linear dodecylbenzenesulfonate and 0.15 percent of the sodium salt of the styrene-maleic anhydride copolymer dissolved in soft water containing 50 p.p.m. of dissolved salts expressed as $CaCO_3$. An identical stock solution without any of the sodium salt of the styrene-maleic anhydride copolymer was also made up.

Soiled cotton test cloth, commercially available (U. S. Testing Co., Inc.) for detergency experimentation, was cut into four-inch square swatches. Sample test solutions heated to 120° F. were placed into each one of the four beakers of a Terg-O-tometer (U. S. Testing Co., Inc.) in which the test solutions were maintained at 120° F. during testing. Six swatches were placed into each beaker and were washed for 15 minutes at an agitator speed of 100 c.p.m. The swatches were then removed and squeezed by hand and again agitated in the beakers using a rinse solution of the same hardness at 120° F. The swatches were next removed, squeezed by hand, air-dried and pressed with a warm iron on the reverse side. The reflectance of each swatch was determined with a Photovolt Reflection Meter (Model 610) using a large search unit (Model 610D) and a green-tristimulus filter. The difference in the average reflectance of the six washed swatches compared with the average reflectance before washing is the increase in average reflectance and represents the detergency or cleaning capacity of each solution. The increase in average reflectance of each group of washed swatches is set out in Table I.

TABLE I

| Sample | Ratio of Styrene to Maleic Anhydride | Molecular Weight | Increase in Average Reflectance |
| --- | --- | --- | --- |
| 1 none used | — | | 6.9 |
| 2 | 1:1 | 4,900 | 9.3 |
| 3 | 1:1 | 1,700 | 6.7 |
| 4 | 1:1 | 750 | 6.4 |
| 5 | 2:1 | 1,700 | 5.8 |
| 6 | 3:1 | 1,700 | 4.5 |

These data thus show that the copolymer of this invention as used in sample 2 gives substantially better detergency than copolymers consisting of like components but of substantially lower molecular weight.

EXAMPLE 3

A series of experiments were carried out in which the sodium salt of the copolymer as described in Example 1 and other builder materials were compared with an identical solution without a builder. Each solution contained 0.03 percent of a commercial linear tridecylbenzenesulfonate in water of 150 p.p.m. hardness expressed as $CaCO_3$. The washes were each carried out as described in Example 2. The brightness of the test cloths washed in each detergent solution, including the solution that did not contain a builder, was determined. The cleaning of the test cloths attained in using the different builder materials is set out in Table II as a percentage increase in brightness above the brightness of the test cloths washed without any builder.

TABLE II

| Sample | Builder[a] | Amount of Builder, Wt.% | Percent Increase in Brightness |
| --- | --- | --- | --- |
| 7 | SMA | 0.06 | 78 |
| 8 | SMA-STPP | 0.06 | 75 |
| 9 | STPP | 0.06 | 55 |
| 10 | SNTA | 0.06 | 52 |
| 11 | SMA | 0.09 | 68 |
| 12 | SMA-STPP | 0.09 | 62 |
| 13 | STPP | 0.09 | 42 |
| 14 | SNTA | 0.09 | 52 |

[a] SMA is the sodium salt of the styrene-maleic anhydride copolymer prepared in Example 1.
SMA-STPP is a 50:50 mixture of the two components.
STPP is sodium tripolyphosphate.
SNTA is sodium nitrilotriacetate.

These results illustrate the greater detergency obtained by the use of a commercial surfactant and the copolymer of this invention in contrast to the conventional tripolyphosphate or nitrilotriacetate builders.

EXAMPLE 4

A series of sample detergent solutions were made up using a standard detergent formulation of 20 percent of a linear tridecylbenzenesulfonate surfactant, 50 percent builder, 25 percent sodium sulfate and 5 percent sodium metasilicate. The only variable in these samples was the builder component. Sodium tripolyphosphate, sodium nitrilotriacetate and the sodium salt of the styrene-maleic anhydride copolymer as prepared in Example 1 were separately used as builder materials. Most samples consisted of a mixed builder consisting of sodium tripolyphosphate (STPP) as one builder constituent and either sodium nitrilotriacetate (SNTA) or the sodium salt of the styrene-maleic anhydride copolymer (SMA) as the second builder constituent in varying amounts such that the total builder component of each formulation was 50 percent. The formulations were made up in water to a surfactant plus builder concentration of 0.15 percent. The water hardness of the wash solutions was 50 and 200 p.p.m. expressed as $CaCO_3$. Wash conditions were identical with those described in Example 2.

The results of these experiments are set out in Tables III and IV in which the "Percent Difference in Brightness" is the percent difference in the brightness (reflectance) of the test cloth after washing with each one of the sample detergent solutions from the brightness of the test cloth after washing with the sample solution in which sodium tripolyphosphate alone is used as the builder. Table III sets forth the results when the sodium salt of the styrene-maleic anhydride copolymer as prepared in Example 1 is used in the formulation.

TABLE III

| Sample | SMA,% | STPP,% | Water, hardness, p.p.m. | % difference in brightness |
| --- | --- | --- | --- | --- |
| 15 | 0 | 50 | 200 | 0 |
| 16 | 6.25 | 43.75 | 200 | 17 |
| 17 | 12.5 | 37.5 | 200 | 25 |
| 18 | 25 | 25 | 200 | 28 |
| 19 | 50 | 0 | 200 | 31 |
| 20 | 0 | 50 | 50 | 0 |
| 21 | 6.25 | 43.75 | 50 | 13 |
| 22 | 12.5 | 37.5 | 50 | 15 |
| 23 | 25 | 25 | 50 | 11 |
| 24 | 50 | 0 | 50 | −1 |

Table IV sets forth the results when sodium nitrilotriacetate is used in the formulation.

TABLE IV

| Sample | NTA,% | STPP,% | Water, hardness, p.p.m. | % difference in brightness |
| --- | --- | --- | --- | --- |
| 25 | 6.25 | 43.75 | 200 | 10 |
| 26 | 12.5 | 37.5 | 200 | 15 |
| 27 | 25 | 25 | 200 | 16 |
| 28 | 50 | 0 | 200 | 1 |
| 29 | 6.25 | 43.75 | 50 | 0 |
| 30 | 12.5 | 37.5 | 50 | 0 |

| 31 | 25 | 25 | 50 | 1 |
| 32 | 50 | 0  | 50 | 8 |

The data in Table III shows with the formulation used that the partial or complete replacement of sodium tripolyphosphate builder with the sodium salt of the styrene-maleic anhydride copolymer results in substantially superior cleaning in hard water (200 p.p.m. CaCO$_3$) and significantly superior cleaning in soft water (50 p.p.m. CaCO$_3$) in all concentrations except one containing 50 percent of the copolymer, i.e., complete replacement of the sodium tripolyphosphate, at which concentration the copolymer is substantially equal to sodium tripolyphosphate. In comparing Table III with Table IV it is seen that the replacement of sodium tripolyphosphate with sodium nitrilotriacetate improves the cleaning ability of the detergent formulation substantially less than does the sodium salt of the styrene-maleic anhydride copolymer at all concentrations in both hard and soft water except in the complete replacement of the sodium tripolyphosphate in soft water. These data indicate that sodium tripolyphosphate builder can be partially or completely replaced with a water-soluble salt of the styrene-maleic anhydride copolymer to provide greater building properties or alternatively, to provide substantially equivalent building properties with much less total builder in the detergent formulation.

It should be understood that the above examples are merely illustrative of the principles of the present invention and that various modifications may be made in the examples given without departing from the spirit and scope of the invention as defined in the following claims.

I claim:

1. A detergent composition consisting essentially of an anionic organic water-soluble detergent surfactant selected from the group consisting of alkyl sulfates, alkyl aryl sulfonates, alkane sulfonates and olefin sulfonates, a builder material consisting essentially of at least about 10 percent of a water-soluble sodium or potassium salt of a copolymer composition having the formula

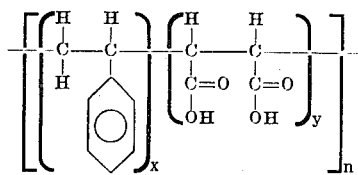

wherein the ratio of $x$ and $y$ is about 1, $n$ is an integer such that the molecular weight of the copolymer is at least about 3,000, and the equivalent weight is about 110 in the acid form and optionally up to about 90 percent of an alkali metal salt of a polyphosphate, the ratio of said builder material to said detergent surfactant being in the range of about 1:2 to about 10:1 by weight.

2. A detergent composition in accordance with claim 1 in which the copolymer is made from styrene and maleic anhydride.

3. A detergent composition in accordance with claim 1 in which said salt of the copolymer composition constitutes at least about 20 percent of the total builder present in said detergent composition.

4. A detergent composition in accordance with claim 1 in which said polyphosphate is sodium tripolyphosphate.

5. A detergent composition in accordance with claim 1 in which the ratio of said builder material to said detergent surfactant is in the range of about 1:1 to about 5:1.

6. A detergent composition in accordance with claim 1 in which said salt of the copolymer composition constitutes about 100 percent of the total builder present in said detergent composition.

7. A detergent composition in accordance with claim 1 having a pH between about 9.5 and about 11.5.

* * * * *